(12) United States Patent
Ivanova et al.

(10) Patent No.: US 9,387,448 B2
(45) Date of Patent: Jul. 12, 2016

(54) FLUID FLOW MIXER

(71) Applicant: ATCO STRUCTURES & LOGISTICS LTD., Calgary (CA)

(72) Inventors: Valentina Ivanova, Cambridge (CA); Jeffrey Philip Wirt, Tulsa, OK (US)

(73) Assignee: INNOVA GLOBAL LTD., Cambridge (CA)

( * ) Notice: Subject to any disclaimer, the term of this patent is extended or adjusted under 35 U.S.C. 154(b) by 610 days.

(21) Appl. No.: 13/677,102

(22) Filed: Nov. 14, 2012

(65) Prior Publication Data

US 2014/0134085 A1   May 15, 2014

(51) Int. Cl.
| | | |
|---|---|---|
| *B01F 5/06* | (2006.01) | |
| *B01F 5/04* | (2006.01) | |
| *B01F 3/04* | (2006.01) | |
| *B01D 53/86* | (2006.01) | |
| *B01D 53/90* | (2006.01) | |

(52) U.S. Cl.
CPC .......... *B01F 5/0618* (2013.01); *B01D 53/8631* (2013.01); *B01D 53/90* (2013.01); *B01F 3/04049* (2013.01); *B01F 5/0451* (2013.01); *B01F 5/0456* (2013.01); *B01F 5/0463* (2013.01); *B01D 2251/2062* (2013.01); *B01D 2258/0283* (2013.01)

(58) Field of Classification Search
CPC .......... B01F 5/0616; B01F 2005/0638; B01F 5/0453; B01F 5/0456; B01F 2005/0639; B01F 5/061; B01F 2005/0626; B01F 2005/0627; F23D 14/70; F23D 14/20
USPC ............................. 366/336, 337, 175.2, 174.1
See application file for complete search history.

(56) References Cited

U.S. PATENT DOCUMENTS

| | | | | | |
|---|---|---|---|---|---|
| 1,103,253 | A | * | 7/1914 | Bennett | 239/429 |
| 2,688,986 | A | * | 9/1954 | O'Brien | 138/38 |
| 2,867,386 | A | * | 1/1959 | Wilfred et al. | 241/46.11 |
| 3,051,464 | A | * | 8/1962 | Yeo et al. | 432/222 |
| 3,302,687 | A | * | 2/1967 | Gjerde | 431/266 |
| 3,494,712 | A | * | 2/1970 | Binasik et al. | 431/171 |
| 3,675,901 | A | * | 7/1972 | Rion | 366/174.1 |
| 3,734,111 | A | * | 5/1973 | McClintock | 137/3 |
| 4,085,462 | A | * | 4/1978 | Booy | 366/175.2 |
| 4,220,416 | A | * | 9/1980 | Brauner et al. | 366/337 |
| 4,255,124 | A | * | 3/1981 | Baranowski, Jr. | 431/353 |
| 4,296,779 | A | * | 10/1981 | Smick | 138/38 |
| 4,493,638 | A | * | 1/1985 | Scammell | 431/202 |
| 4,497,752 | A | * | 2/1985 | Huber | 261/95 |
| 4,564,298 | A | * | 1/1986 | Gritters et al. | 366/173.2 |
| 4,573,803 | A | * | 3/1986 | Gritters et al. | 366/173.2 |
| 4,643,670 | A | * | 2/1987 | Edwards et al. | 431/202 |
| 5,378,063 | A | * | 1/1995 | Tsukada | 366/337 |
| 5,380,088 | A | * | 1/1995 | Fleischli et al. | 366/162.1 |
| 5,431,894 | A | * | 7/1995 | Onishi et al. | 423/239.1 |

(Continued)

*Primary Examiner* — Tony G Soohoo
(74) *Attorney, Agent, or Firm* — Bennett Jones LLP

(57) ABSTRACT

An apparatus is provided for injecting and mixing a treating agent into a fluid stream. The apparatus comprises at least one pipe having a treating agent flowing therethrough. A flow mixer having a planar middle section with two furcated sides is disposed along the length of the pipe. Each furcated side may include at least two branches, each of which may have a flattened outer edge. The pipe has holes that may inject the treating agent towards the planar middle section. Adjacent flow mixers are separated by a distance. As fluid flows into and past the flow mixers, the injected treating agent is mixed with the fluid stream and the mixing is enhanced in turbulent mixing zones in between the flow mixers.

19 Claims, 5 Drawing Sheets

(56) References Cited

U.S. PATENT DOCUMENTS

| | | | |
|---|---|---|---|
| 5,435,976 A * | 7/1995 | Berner et al. | 422/168 |
| 5,456,533 A * | 10/1995 | Streiff et al. | 366/173.1 |
| 5,489,153 A * | 2/1996 | Berner et al. | 366/337 |
| 5,522,661 A * | 6/1996 | Tsukada | 366/337 |
| 6,135,629 A * | 10/2000 | Dohmann | 366/181.5 |
| 6,676,286 B2 * | 1/2004 | Grutter et al. | 366/337 |
| 6,779,786 B2 * | 8/2004 | Ruscheweyh et al. | 261/79.2 |
| 7,383,850 B2 * | 6/2008 | Buzanowski et al. | 137/1 |
| 7,448,794 B2 * | 11/2008 | Hansen | 366/174.1 |
| 7,547,134 B2 * | 6/2009 | Hansen | 366/175.2 |
| 8,011,601 B2 * | 9/2011 | Denlinger et al. | 239/10 |
| 8,017,084 B1 * | 9/2011 | Wirt et al. | 422/172 |
| 8,147,124 B1 * | 4/2012 | Glanville | 366/338 |
| 8,397,495 B2 * | 3/2013 | Salanta et al. | 60/324 |
| 8,684,593 B2 * | 4/2014 | Moser et al. | 366/336 |
| 9,010,994 B2 * | 4/2015 | McQueen et al. | 366/337 |
| 9,067,176 B2 * | 6/2015 | Ferguson | |
| 2003/0072214 A1 * | 4/2003 | Fleischli et al. | 366/175.2 |
| 2009/0293721 A1 * | 12/2009 | Miller et al. | 95/107 |
| 2010/0097883 A1 * | 4/2010 | Habibi-Naini | 366/337 |
| 2011/0174408 A1 * | 7/2011 | Lundberg et al. | 138/39 |
| 2012/0279207 A1 * | 11/2012 | Gaiser | 60/324 |
| 2013/0298996 A1 * | 11/2013 | Tabikh et al. | 137/1 |
| 2013/0336084 A1 * | 12/2013 | Janz | 366/338 |
| 2014/0134085 A1 * | 5/2014 | Ivanova et al. | 423/210 |

* cited by examiner

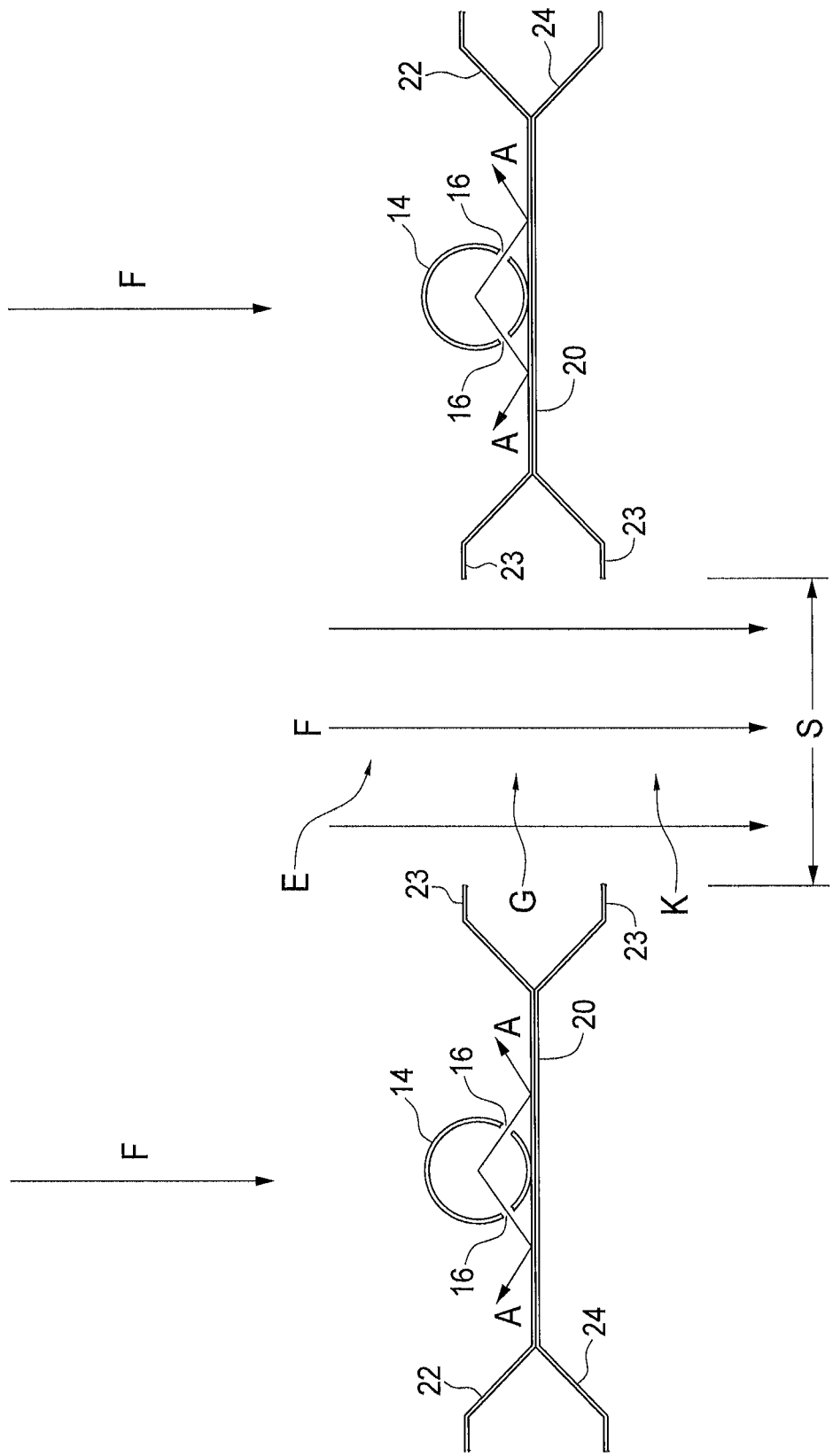

FLUID FLOW MIXER

FIELD

This invention relates generally to an apparatus for fluid treatment, and more particularly relates to an apparatus for injecting a treating agent into a fluid stream while generating enhanced fluid phase turbulence to better distribute and mix the injected treating agent into the fluid.

BACKGROUND

During the course of treating a fluid, for instance to control the atmospheric emission of polluting contaminants, it is common to disperse a treating agent into the fluid in order to combine with a catalyst to treat the undesired component of the fluid. In general, a mixing apparatus is used to disperse the treating agent into the fluid. Holes, which include hardened holes, holes, nozzles, injection nozzles, and the like, can be used for this purpose. Since simple ejection of the agent from such holes is not very effective in thoroughly mixing the agent with the fluid, it is also known to use baffles (sometimes also referred to as "deflectors" and "flow mixers"), usually positioned directly downstream of the injection point to encourage turbulence, thereby enhancing the mixing of the agent with the fluid.

One of the applications of the mixing apparatus is the treatment of flue gas containing nitric oxide and nitric dioxide (collectively, "NOx") and other hazardous chemicals produced during the combustion of fossil fuels. NOx emissions may be minimized by catalytically reducing flue gas NOx to nitrogen and water using ammonia ($NH_3$) in a chemical reaction before releasing the gas into the atmosphere.

Flue gas may be treated by passing the gas through treatment systems, which attempt to provide maximum exposure of the catalyst to the flue gas in order to ensure that all the flue gas comes sufficiently into contact with the catalyst for treatment.

In the treatment systems, a treating agent, such as ammonia, is typically introduced into the flue gas stream by the mixing apparatus comprised of pipes having a plurality of holes. The mixing apparatus is designed to provide an even distribution of ammonia throughout the flue gas. The holes on the mixing apparatus are usually arranged such that the ammonia is injected into the flue gas towards a catalyst bed located downstream in the treatment system.

Ammonia is commonly injected through the mixing apparatus into the flow of flue gas by utilizing an external ammonia vaporization system wherein liquid ammonia, either in an anhydrous or aqueous state, is vaporized in a heater or vaporizer, mixed with dilution air, and then routed to the mixing apparatus for injection into the flow of flue gas at a location upstream of the mixing apparatus. Typically, the ammonia is diluted with water prior to being injected through the mixing apparatus into the flow of flue gas.

To increase the mixing efficiency, some mixing apparatus include baffles disposed adjacent to the holes of the pipes or baffles installed between the pipes. Known mixing apparatus commonly utilize horizontal baffles for creating a turbulent mixing effect. Other mixing apparatus utilize square pipes rather than conventional circular pipes. Other known apparatus utilize baffles located in an upstream position from the pipes to create a wake downstream to increase the ammonia flue gas mixing efficiency.

It is therefore desirable to provide a mixing apparatus that evenly distributes the ammonia into the flue gas before reaching downstream catalyst for heat recovery, steam generation systems, packaged boilers, simple or combined cycle catalyst systems, and fired heaters.

SUMMARY OF INVENTION

In accordance with a broad aspect of the present invention, there is provided a flow mixer comprising a middle section having a first side and a second side, one or both of the first side and the second side having an edge furcated along its length.

In accordance with another broad aspect of the invention, the furcated edge of the flow mixer comprises a first branch and a second branch.

In accordance with another broad aspect of the invention, there is provided a fluid mixing apparatus for mixing a first fluid with a second fluid having a flow direction comprising: at least one pipe having a plurality of holes; and at least one flow mixer, each of which is associated with one of the at least one pipe, the at least one flow mixer each having a middle section, one or both sides of which having a furcated lengthwise edge.

In accordance with another broad aspect of the invention, there is provided a method of mixing a first fluid with a second fluid stream having a flow direction comprising: providing at least one flow mixer in the second fluid stream, the at least one flow mixer comprising a middle section, one or both lengthwise sides of which having a furcated edge; and injecting the first fluid into the second fluid stream near the at least one flow mixer.

BRIEF DESCRIPTION OF THE DRAWINGS

Drawings are included for the purpose of illustrating certain aspects of the invention. Such drawings and the description thereof are intended to facilitate understanding and should not be considered limiting of the invention. Drawings are included, in which:

FIG. 4 is a cross-sectional view along line C-C of adjacent flow mixers of FIG. 1;

DETAILED DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
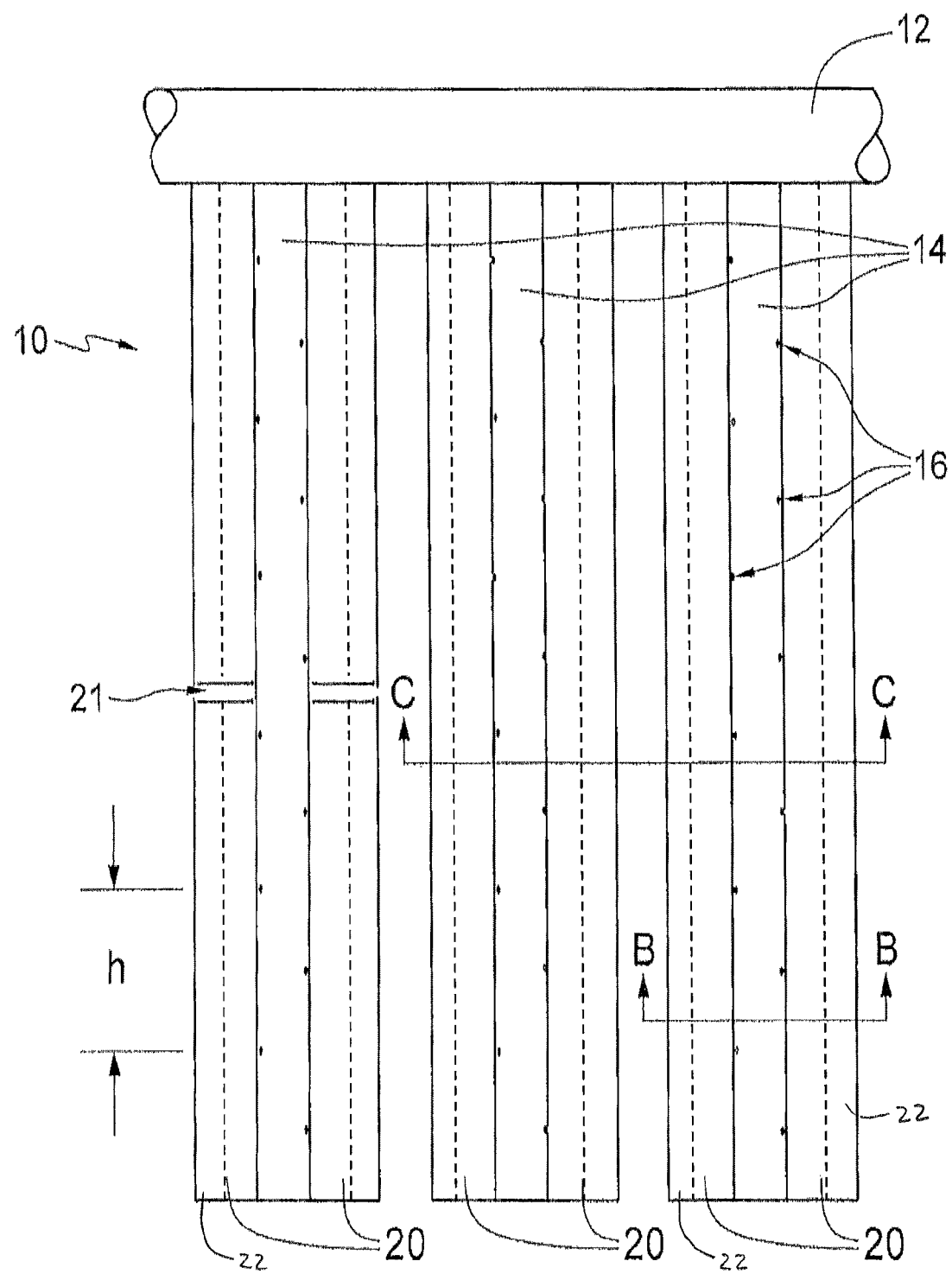
FIG. 1 is an elevation view of a treating agent injection apparatus having flow mixers in accordance with an illustrative embodiment of the present invention.

FIG. 1 shows a treating agent injection apparatus 10 comprising a manifold 12 and pipes 14 each having a plurality of holes 16. Manifold 12 is in fluid communication with the pipes 14 for supplying treating agent, such as diluted ammonia, from a vaporizer or heater (not shown) to each of the holes 16. Flow mixers 20 are associated with at least some of pipes 14. Apparatus 10 is installed in a flue and flue gas passes thereby between pipes 14 and flow mixers 20. Apparatus 10 may be integrated into a treatment system (not shown), wherein apparatus 10 is situated upstream of a catalyst bed (not shown). Apparatus 10 may be constructed to be mounted on a skid to be easily transported to a desired location.

Each pipe 14 has a central lengthwise axis and pipes 14 may have their central axes substantially vertical and in substantially parallel alignment with each other in apparatus 10. However, those skilled in the art will appreciate that other axial alignments and arrangements may be used with apparatus 10, such as horizontal or diagonal. As shown, pipes 14 are aligned along the same plane, but pipes 14 may also be in a staggered arrangement.

The holes 16 direct a treating agent into the flow of the flue gas. Holes 16 may be staggered on either side along the length of the pipe 14. The distance between adjacent holes on one side of the pipe 14 is designated h. Holes 16 may be angled upstream or downstream relative to the flow of flue gas.

Flow mixers 20 include any object designed to disrupt and/or redirect fluid flow. Flow mixers 20 are disposed near pipes 14 or supported on pipes 14. In one embodiment, flow mixers 20 are disposed along the length of pipes 14. Each of flow mixers 20 may be a single piece of material that spans substantially the entire length of pipes 14. Alternatively, each of flow mixers 20 may comprise of a plurality of sections, wherein adjacent sections are separated by a gap 21, which provides space to allow for any thermal expansion of the flow mixer 20. Flow mixer 20 may be secured to existing mixing systems on the upstream side or downstream side of pipes 14.

Figure 2:
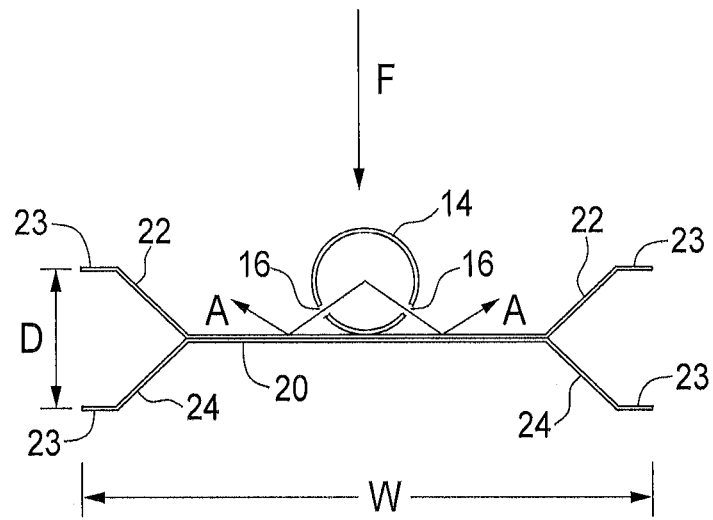
FIG. 2 is a cross-sectional view along line B-B of one of the flow mixers of FIG. 1.

FIG. 2 illustrates an embodiment of pipe 14 and flow mixer 20 for use in apparatus 10 of the present invention. The direction of flue gas flow is designated by an arrow F. Flow mixer 20 is associated with the downstream side of each pipe 14. Flow mixer 20 has a first side and a second side, and a middle section therebetween. The middle section has a substantially planar surface that is substantially perpendicular to flow F. Each side of flow mixer 20 has an edge that is furcated along its length, providing a plurality of branches. In one embodiment, the edge is bifurcated to provide a first branch 22 and a second branch 24. In a further embodiment, the first branch 22 is angled upstream and the second branch 24 is angled downstream. In another embodiment, branches 22 and 24 are symmetrical about the plane of the middle section of flow mixer 20. The angle between branches 22 and 24 may range from 75 to 105 degrees. In a further embodiment, branch 22 may be angled between 37.5 and 52.5 degrees relative to flow F upstream and branch 24 may be angled between 37, 5 and 52.5 degrees relative to flow F downstream. In yet another embodiment, each branch 22, 24 includes a flattened outer edge 23, which may be substantially parallel to the plane of the middle section of flow mixer 20. In still another embodiment, edge 23 may be angled at 45 degrees upstream to 45 degrees downstream relative to flow F, but is preferably substantially perpendicular to flow F. In a further embodiment, edges 23 on either side of the flow mixer are substantially parallel to one another. In a still further embodiment, the first side and second side of flow mixer 20 may also be symmetrical. The width of flow mixer 20 is depicted by the letter W and the distance between the branches on each side of flow mixer 20 is depicted by the letter D. In one embodiment, width W ranges between 5" and 9". In a further embodiment, distance D ranges from approximately ½" to 2".

Figure 3:
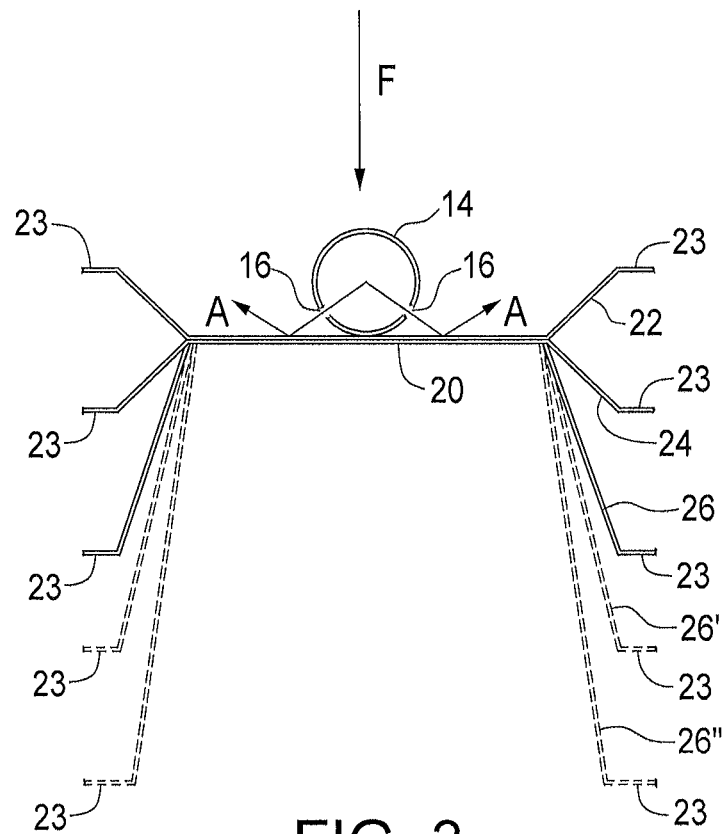
FIG. 3 is a cross-sectional view along line B-B, illustrating another embodiment of the flow mixer of FIG. 1.

FIG. 3 shows another embodiment of pipe 14 and flow mixer 20, each side of which further includes a third branch 26. Flow mixer 20 may include additional branches 26' and/or 26". The additional branches may be angled upstream or downstream relative to flow F. In one embodiment, the angle of each of branches 26, 26' and 26" may range from 5 degrees to 45 degrees downstream relative to flow F. Branches 26, 26', and 26" may also each include edge 23.

Referring to both FIGS. 2 to 4, pipe 14 extends generally transverse to the flow F and is positioned on the flow-facing (i.e. upstream) surface of flow mixer 20. Pipe 14 may be positioned generally centrally in the middle section of flow mixer 20 relative to the sides, such that flow mixer 20 is symmetrical about a central line of pipe 14, wherein the central line is substantially parallel to flow F. In one embodiment, flow mixers 20 are mounted on to pipes 14. Flow mixers 20 may be mounted on to pipes 14 in various ways, including providing holes along the length of the middle section, through which pipe 14 maybe fastened using fasteners or the like. In another embodiment, holes 16 are on the downstream side of pipes 14, and angled downstream relative to the flow F and towards flow mixer 20. The preferred angle of the holes relative to flow F depends on the angles of branches. Preferably, the holes are angled relative to flow F such that the treating agent, after it exits the holes and encounters the middle section and the flue gas, has enough momentum to flow around the outer edges of the branches. In one embodiment, the holes are angled downstream relative to flow F and the angle ranges from 15 degrees to 90 degrees relative to flow F. The holes are sized such that the Reynolds number of the treating agent flow is high where the treating agent passes through the hole. Preferably, the Reynolds number of the treating agent at the holes ranges between 15,000 and 30,000. In one embodiment, the hole diameter ranges from 3/64" to 1/16", Arrows A illustrate the general flow path of the treating agent as it exits pipes 14 and encounters the surface of flow mixer 20. Referring to FIG. 4, by directing the injection of the treating agent toward the upstream surface of flow mixer 20, the movement of the treating agent bouncing off flow mixer 20 and flowing along branch 22 provides a first highly turbulent mixing zone E for the treating agent and the flue gas to intermix between adjacent flow mixers. As the flue gas is swept from a low velocity zone into a relatively high velocity zone (i.e. the first mixing zone) an exchange of energy takes place which provides an excellent environment for mixing. From zone E, the treating agent continues on to areas with lower energy flue gas.

The flue gas and injected treating agent mixture flow around branches 22 and 24 in order to continue travelling downstream. A second mixing zone G and a third mixing zone K are provided in the turbulent vortices created as the mixture flows around branches 22 and 24, respectively, in between adjacent flow mixers. In each mixing zone, more exchange of energy between the flue gas and the treating agent takes place, resulting in an increased mixing efficiency between the two fluids.

As shown in FIG. 4, adjacent flow mixers 20 of apparatus 10 are spaced apart by a distance S. In one embodiment, distance S ranges between 2¾" and 6¾". Preferably, the magnitude of distance S and the configuration of adjacent flow mixers provide a turbulent flow in zone G with a Reynolds number between $9 \times 10^5$ and $2 \times 10^6$.

Figure 6:
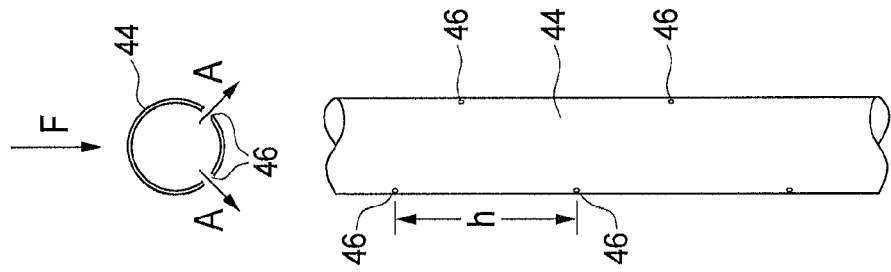
FIG. 6 is a cross-sectional view and an elevation view of a pipe of the injection apparatus of FIG. 5.
Figure 5:
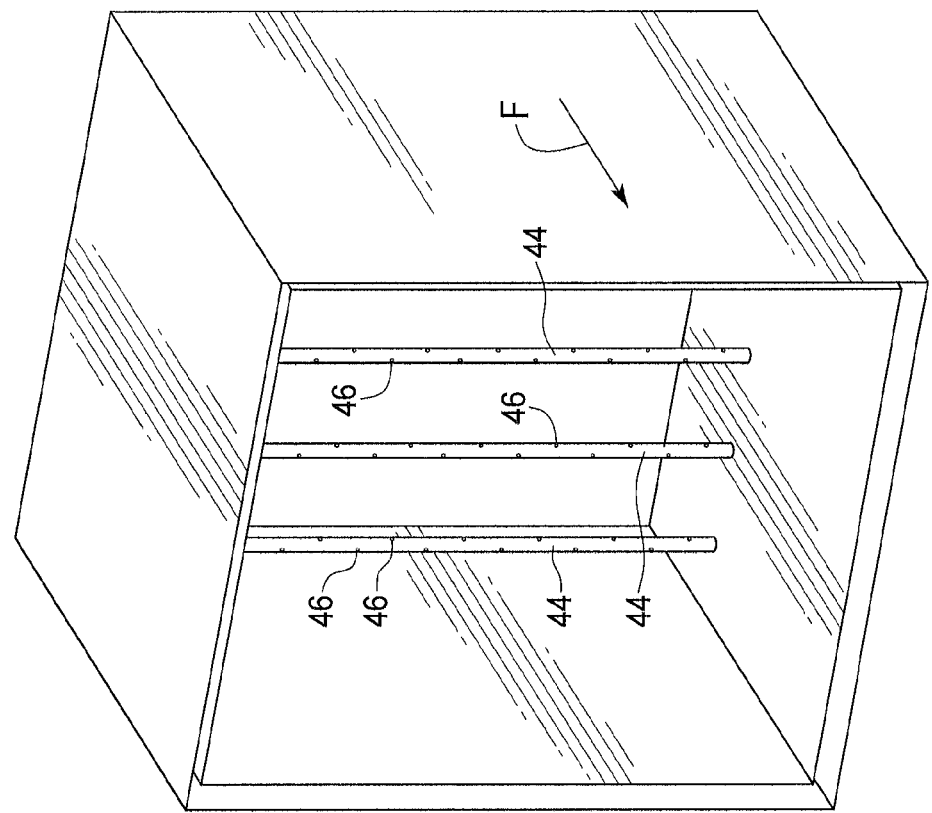
FIG. 5 is a perspective view of a prior art treating agent injection apparatus.

FIG. 5 is a perspective view of a prior art injection apparatus a plurality of pipes 44 having a plurality of holes 46 for injecting treating agent into the flue gas flow F. The injected treating agent is mixed with the flue gas in a turbulent wake created by the pipes 44. FIG. 6 illustrates the position of pipe 44 relatively to the direction of flow F and the direction at which the treating agent is ejected from holes 46. The distance h between adjacent holes 46 on one side of pipe 44 is shown in the elevation view of pipe 44 in FIG. 6.

The data shown in Table 1 below is collected from the testing of a model of the prior art injection apparatus shown in FIG. 5. To obtain measurements from the model, a tracer gas (such as for example CO) is injected into the pipes in place of a treating agent. Tracer gas is used in place of a treating agent because the tracer gas is generally safer and the concentration of which is easier to measure than a treating agent. The model comprises three evenly spaced apart vertical pipes disposed within a flue conduit on substantially the same plane, the plane being substantially perpendicular to the flue gas flow direction F. Each of the pipes in the model has a diameter of about 1⅞" and is about 4' 10" in length. The distance between adjacent pipes is about 11¾". In the model, the distance h between adjacent holes is about 8¼". The direction at which tracer gas exits from holes 46 is designated by arrows A. The holes are angled at about 55 degrees downstream relative to the flow F. The holes are about 1/16" each in diameter. The flue conduit in which the pipes are positioned is approximately 2' 11¼" in width and 5' 4½" in height. The flue conduit includes four spaced-apart perforated plates upstream from the pipes for dispersing the flue gas as the gas passes through the plates, in order to provide a substantially uniform flow of flue gas immediately upstream from the pipes.

The testing on the model is done with a tracer gas flow rate of 19 actual cubic feet per minute (ACFM) and a flue gas flow rate of 7013 ACFM. The concentration of the tracer gas is measured at various locations downstream from the pipes using a probe attached to a gas analyzer.

The numbers in Table 1 are normalized concentration values of the tracer gas viewed in the direction of flow. The values in table 1 are generated from measuring the concentration of the tracer gas at 60 locations on a plane substantially perpendicular to the direction of flow F at about 8' downstream from the pipes. More specifically, measurements were taken in a grid-like pattern having six columns across the width of the flue conduit and ten rows along the height of the flue conduit, which provides 60 measurement locations on that plane. Normalized concentration is calculated using the following formula:

$$\frac{\text{MEASURED } CONC.}{\text{MEAN } CONC.} \times 100 = \text{NORMALIZED CONCENTRATION}$$

TABLE 1

Normalized Concentrations - Pipes without Baffles

|   | 1 | 2 | 3 | 4 | 5 | 6 | Row Averages |
|---|---|---|---|---|---|---|---|
| 1 | 103 | 107 | 113 | 113 | 118 | 126 | 113 |
| 2 | 86 | 88 | 101 | 92 | 97 | 105 | 95 |
| 3 | 82 | 84 | 84 | 78 | 73 | 86 | 81 |
| 4 | 92 | 88 | 97 | 99 | 86 | 78 | 90 |
| 5 | 105 | 97 | 107 | 103 | 94 | 94 | 100 |
| 6 | 113 | 107 | 118 | 111 | 99 | 111 | 110 |
| 7 | 105 | 103 | 113 | 113 | 97 | 113 | 107 |
| 8 | 120 | 107 | 113 | 111 | 103 | 120 | 112 |
| 9 | 84 | 97 | 105 | 103 | 101 | 118 | 101 |

TABLE 1-continued

Normalized Concentrations - Pipes without Baffles

|   | 1 | 2 | 3 | 4 | 5 | 6 | Row Averages |
|---|---|---|---|---|---|---|---|
| 10 | 88 | 90 | 92 | 84 | 84 | 103 | 90 |
| Column Averages | 98 | 97 | 104 | 101 | 95 | 105 | |

Based on the data in Table 1, the root mean square (RMS) deviation is 12.3%. RMS deviation is the standard deviation of the population divided by the mean. Since RMS is a statistical measure of variation, a high RMS deviation percentage indicates poor mixing of tracer gas as some areas have higher concentrations of tracer gas than others. The lower the RMS deviation percentage, the more evenly distributed the tracer gas since a low RMS deviation percentage indicates that the concentrations of tracer gas at various data points are roughly the same.

Figure 7:
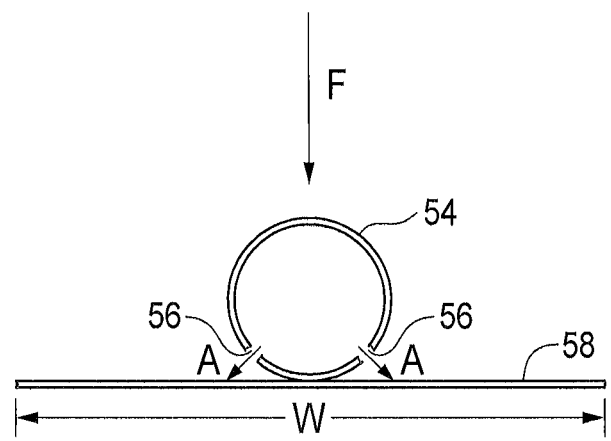
FIG. 7 is an end view of a prior art baffle plate associated with a pipe.

Referring to FIG. 7 and Table 2 below, data is collected from testing a model of a prior art injection apparatus with a baffle 58 associated with each pipe 54. The model has the same parameters as the above-described model in FIG. 5, except that each of the three pipes is associated with a baffle 58. Baffles 58 are substantially flat and substantially rectangular and each have a width W of about 8". The baffles are disposed lengthwise along the length of the pipes 54, downstream therefrom. The distance between the side edges of adjacent baffles is about 3¼". The direction at which tracer gas exits from holes 56 is designated by arrows A. The holes are angled at about 55 degrees downstream relative to the flow F. The concentration of the tracer gas is measure in the same manner as described above.

TABLE 2

Normalized Concentrations - Pipes with Baffle Plates

|   | 1 | 2 | 3 | 4 | 5 | 6 | Row Averages |
|---|---|---|---|---|---|---|---|
| 1 | 92 | 91 | 91 | 89 | 89 | 89 | 90 |
| 2 | 99 | 99 | 97 | 97 | 96 | 96 | 97 |
| 3 | 99 | 100 | 100 | 102 | 102 | 102 | 101 |
| 4 | 105 | 105 | 105 | 105 | 105 | 103 | 105 |
| 5 | 105 | 105 | 105 | 105 | 105 | 105 | 105 |
| 6 | 105 | 105 | 103 | 103 | 103 | 105 | 104 |
| 7 | 103 | 103 | 102 | 102 | 103 | 103 | 103 |
| 8 | 102 | 102 | 100 | 102 | 102 | 103 | 102 |
| 9 | 100 | 97 | 99 | 97 | 97 | 99 | 98 |
| 10 | 94 | 96 | 96 | 94 | 94 | 96 | 95 |
| Column Averages | 100 | 100 | 100 | 100 | 100 | 100 | |

Based on the data in Table 2, the RMS deviation in the normalized tracer gas concentration is 4.7%. This is better than the results from the set up of FIG. 5.

Referring to FIGS. 2 and 4, and Table 3 below, data is collected from testing a model of the injection apparatus with the flow mixer 20 of the present invention associated with each pipe 14. The model has the same parameters as the above-described model in FIG. 5, except that each of the three pipes is associated with flow mixer 20 disposed lengthwise along the length of the pipe, attached on the downstream side thereof. In the model, flow mixer 20 has a width W of about 8" and has branches 22 and 24 on both sides. Branch 22 is angled at about 45 degrees relative to flow F upstream and branch 24 is angled at about 45 degrees relative to flow F downstream. Branches 22 and 24 each include outer edge 23, which is substantially perpendicular to flow F. The distance D between branches 22 and 24 is about 2". The distance S between adjacent flow mixers is about 3¾". The direction at which tracer gas exits from holes 16 is designated by arrows A. The holes are angled at about 55 degrees downstream relative to the flow F.

TABLE 3

Normalized Concentrations - Pipes with Double Edged Flow Mixers

|  | 1 | 2 | 3 | 4 | 5 | 6 | Row Averages |
|---|---|---|---|---|---|---|---|
| 1 | 98 | 99 | 96 | 94 | 94 | 93 | 96 |
| 2 | 99 | 101 | 99 | 98 | 96 | 96 | 98 |
| 3 | 103 | 101 | 101 | 101 | 101 | 101 | 101 |
| 4 | 103 | 103 | 103 | 103 | 103 | 103 | 103 |
| 5 | 103 | 103 | 103 | 104 | 104 | 103 | 103 |
| 6 | 103 | 103 | 103 | 104 | 104 | 104 | 104 |
| 7 | 103 | 104 | 104 | 103 | 103 | 103 | 103 |
| 8 | 103 | 103 | 103 | 101 | 101 | 101 | 102 |
| 9 | 98 | 99 | 99 | 98 | 98 | 98 | 98 |
| 10 | 89 | 93 | 94 | 94 | 93 | 89 | 92 |
| Column Averages | 100 | 101 | 101 | 100 | 100 | 99 |  |

Based on the data in Table 3, the RMS deviation in the normalized tracer gas concentration is 3.9%. Therefore, flow mixer 20 is shown to be useful in enhancing the distribution and mixing of injected treating agent in flue gas flow.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. For US patent properties, it is noted that no claim element is to be construed under the provisions of 35 USC 112, sixth paragraph, unless the element is expressly recited using the phrase "means for" or "step for".

I claim:

1. A fluid mixing apparatus for mixing a first fluid with a second fluid, the fluid mixing apparatus comprising:
a pipe having a pipe wall, a center axis and a plurality of holes extending through the pipe wall;
a flow mixer the flow mixer having a middle plate including a first lengthwise side, a second lengthwise side and a facing surface extending between the first and the second lengthwise sides, surface being substantially planar and thereby defining a plane, and a furcated lengthwise edge structure connected along an entire length of at least one of the first and the second lengthwise sides; and
a connection between the middle plate and the pipe to thereby position the furcated lengthwise edge structure substantially parallel to the center axis of the pipe,
wherein the plurality of holes are spaced from the connection and configured such that fluid emitted therefrom impinges against the middle plate at an angle of between 15 degrees to 90 degrees relative to the plane.

2. The fluid mixing apparatus of claim 1, wherein the furcated lengthwise edge structure includes a first branch and a second branch.

3. The fluid mixing apparatus of claim 2, wherein the first branch is angled toward the facing surface and the second branch is angled away from the facing surface.

4. The fluid mixing apparatus of claim 2, wherein the first branch is angled between 37.5 and 52.5 degrees toward the facing surface relative to the plane and the second branch is angled between 37.5 and 52.5 degrees away from the facing surface relative to the plane.

5. The fluid mixing apparatus of claim 4, wherein the first branch is diverges from the second branch by an angle of 90 degrees.

6. The fluid mixing apparatus of claim 2, wherein the furcated lengthwise edge structure further comprises at least one additional branch.

7. The fluid mixing apparatus of claim 6, wherein the at least one additional branch is angled relative to the plane.

8. The fluid mixing apparatus of claim 6, wherein the at least one additional branch comprises a base portion and a planar extension extending from the base portion.

9. The fluid mixing apparatus of claim 2, wherein the branches each comprise a base portion and a planar extension extending from the base portion.

10. The fluid mixing apparatus of claim 9, wherein the planar extension is angled relative to the base portion.

11. The fluid mixing apparatus of claim 9, wherein the planar extension of the first branch and the planar extension of the second branch are substantially parallel to each other.

12. The fluid mixing apparatus of claim 2, wherein the first branch and the second branch are substantially symmetrical about the plane of the middle section.

13. The fluid mixing apparatus of claim 1, wherein the plurality of holes each have a hole diameter of ranging from 3/64" to 1/16".

14. The fluid mixing apparatus of claim 1, wherein the at least one pipe is connected to the facing surface of the middle plate.

15. The fluid mixing apparatus of claim 1, wherein the flow mixer is substantially symmetrical about the center axis of the pipe.

16. The fluid mixing apparatus of claim 1, wherein any adjacent flow mixers are separated by a distance, which ranges between 2¾" and 6¾".

17. The fluid mixing apparatus of claim 1, wherein each of the pipe supports a second flow mixer.

18. The fluid mixing apparatus of claim 17, wherein the flow mixer and the second flow mixer are separated by a gap.

19. The fluid mixing apparatus of claim 1, wherein the furcated lengthwise edge structure includes a first flange extending along a full length of the furcated lengthwise edge structure and having a base connected to the middle plate and a second flange extending along the full length of the furcated lengthwise edge structure connected to the base of the first flange.

* * * * *